US009810050B2

(12) United States Patent
Sites et al.

(10) Patent No.: US 9,810,050 B2
(45) Date of Patent: Nov. 7, 2017

(54) ENHANCED COAL-BED METHANE PRODUCTION

(71) Applicants: O. Angus Sites, Spring, TX (US); Lalit K. Bohra, Spring, TX (US)

(72) Inventors: O. Angus Sites, Spring, TX (US); Lalit K. Bohra, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 172 days.

(21) Appl. No.: 14/358,687

(22) PCT Filed: Nov. 16, 2012

(86) PCT No.: PCT/US2012/065656
§ 371 (c)(1),
(2) Date: May 15, 2014

(87) PCT Pub. No.: WO2013/095829
PCT Pub. Date: Jun. 27, 2013

(65) Prior Publication Data
US 2014/0338901 A1    Nov. 20, 2014

Related U.S. Application Data

(60) Provisional application No. 61/578,045, filed on Dec. 20, 2011.

(51) Int. Cl.
*E21B 43/16* (2006.01)
*E21B 43/00* (2006.01)
(Continued)

(52) U.S. Cl.
CPC .......... *E21B 43/164* (2013.01); *E21B 43/006* (2013.01); *E21B 43/16* (2013.01);
(Continued)

(58) Field of Classification Search
None
See application file for complete search history.

(56) References Cited

U.S. PATENT DOCUMENTS 2,488,911 A    11/1949  Hepburn et al.
2,884,758 A     5/1959  Oberle
(Continued)

FOREIGN PATENT DOCUMENTS

CA    2231749    9/1998
CA    2645450    9/2007
(Continued)

OTHER PUBLICATIONS

Ahmed, S. et al. (1998) "Catalytic Partial Oxidation Reforming of Hydrocarbon Fuels," 1998 Fuel Cell Seminar, 7 pgs.
(Continued)

*Primary Examiner* — Angela M DiTrani
(74) *Attorney, Agent, or Firm* — ExxonMobil Upstream Research Company Law Department

(57) ABSTRACT

Methods and systems for enhanced recovery of coal bed methane. A method includes generating a diluent gas mixture comprising $N_2$ and $CO_2$ in a semi-closed Brayton cycle power plant, injecting at least a portion of the diluent gas mixture into a coal bed, and recovering a mixed production gas comprising methane from the coal bed.

23 Claims, 6 Drawing Sheets

(51) Int. Cl.
  *F01K 23/10* (2006.01)
  *F01K 23/16* (2006.01)
  *F02C 1/08* (2006.01)
  *F02C 3/22* (2006.01)
  *F22B 1/18* (2006.01)

(52) U.S. Cl.
  CPC .............. *F01K 23/10* (2013.01); *F01K 23/16* (2013.01); *F02C 1/08* (2013.01); *F02C 3/22* (2013.01); *F22B 1/1815* (2013.01); *Y02E 20/16* (2013.01)

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,755,114 A * | 5/1998 | Foglietta ............... F25J 1/0035 62/618 |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |

(56) References Cited

U.S. PATENT DOCUMENTS

| | | |
|---|---|---|
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,666 B1 | 9/2001 | Ginter ............... 60/39.05 |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |

(56) References Cited

U.S. PATENT DOCUMENTS

| | | |
|---|---|---|
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 * | 11/2007 | Zapadinski ......... E21B 41/0064 166/265 |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |

(56) References Cited

U.S. PATENT DOCUMENTS

| | | |
|---|---|---|
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0023423 A1* | 2/2002 | Viteri ............... F01K 21/047 60/772 |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1* | 7/2003 | Anderson ......... F01K 23/068 60/39.55 |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0011523 A1* | 1/2004 | Sarada ............. E21B 41/0057 166/244.1 |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |

(56) References Cited

U.S. PATENT DOCUMENTS

| | | |
|---|---|---|
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0186586 A1* | 7/2010 | Chinn ............... B01D 53/22 95/45 |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0023498 A1 | 2/2011 | DeKoeijer et al. ............ 60/780 |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0182298 A1 | 7/2014 | Krull et al. |
| 2014/0182301 A1 | 7/2014 | Fadde et al. |
| 2014/0182302 A1 | 7/2014 | Antoniono et al. |
| 2014/0182303 A1 | 7/2014 | Antoniono et al. |
| 2014/0182304 A1 | 7/2014 | Antoniono et al. |
| 2014/0182305 A1 | 7/2014 | Antoniono et al. |
| 2014/0196464 A1 | 7/2014 | Biyani et al. |

FOREIGN PATENT DOCUMENTS

| | | |
|---|---|---|
| EP | 0770771 | 5/1997 |
| GB | 0776269 | 6/1957 |
| GB | 2117053 | 10/1983 |
| WO | WO9906674 | 2/1999 |
| WO | WO9963210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | PCT/RU2013/000162 | 2/2013 |
| WO | WO2013095829 | 6/2013 |
| WO | WO2013147632 | 10/2013 |
| WO | WO2013147633 | 10/2013 |
| WO | WO2013155214 | 10/2013 |
| WO | WO2014071118 | 5/2014 |
| WO | WO2014071215 | 5/2014 |
| WO | WO2014106265 | 7/2014 |

OTHER PUBLICATIONS

Air Products and Chemicals, Inc. (2008) "Air Separation Technology—Ion Transport Membrane (ITM)," www.airproducts.com/ASUsales, 3 pgs.

Air Products and Chemicals, Inc. (2011) "Air Separation Technology Ion Transport Membrane (ITM)," www.airproducts.com/gasification, 4 pgs.

Anderson, R. E. (2006) "Durability and Reliability Demonstration of a Near-Zero-Emission Gas-Fired Power Plant," California Energy Comm., CEC 500-2006-074, 80 pgs.

Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.

Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.

(56) References Cited

OTHER PUBLICATIONS

BP Press Release (2006) "BP and Edison Mission Group Plan Major Hydrogen Power Project for California," www.bp.com/hydrogenpower, 2 pgs.

Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, 42 pgs.

Foy, Kirsten et al. (2005) "Comparison of Ion Transport Membranes," Fourth Annual Conference on Carbon Capture and Sequestration, DOE/NETL; 11 pgs.

Cho, J. H. et al. (2005) "Marrying LNG and Power Generation," Energy Markets; 10, 8; ABI/INFORM Trade & Industry, 8 pgs.

Ciulia, Vincent. (2001-2003) "Auto Repair. How the Engine Works,"http://autorepair.about.com/cs/generalinfo/a/aa060500a.htm, 1 page.

Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.

Science Clarified (2012) "Cryogenics," http://www.scienceclarified.com/Co-Di/Cryogenics.html; 6 pgs.

Defrate, L. A. et al. (1959) "Optimum Design of Ejector Using Digital Computers," Chem. Eng. Prog. Symp. Ser., 55 ( 21), 12 pgs.

Ditaranto, M. et al. (2006) "Combustion Instabilities in Sudden Expansion Oxy-Fuel Flames," ScienceDirect, Combustion and Flame, v.146, 19 pgs.

Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.

Eriksson, Sara. (2005) "Development of Methane Oxidation Catalysts for Different Gas Turbine Combustor Concepts," KTH—The Royal Institute of Technology, Department of Chemical Engineering and Technology, Chemical Technology, Licentiate Thesis, Stockholm Sweden; 45 pgs.

Ertesvag, I. S. et al. (2005) "Exergy Analysis of a Gas-Turbine Combined-Cycle Power Plant With Precombustion CO_2 Capture," Elsevier, 34 pgs.

ElKady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.

Evulet, Andrei T. et al. (2009) "On the Performance and Operability of GE's Dry Low $NO_x$ Combustors utilizing Exhaust Gas Recirculation for Post-Combustion Carbon Capture," Energy Procedia I, 7 pgs.

Caldwell Energy Company (2011) "Wet Compression"; IGTI 2011—CTIC Wet Compression, http://www.turbineinletcooling.org/resources/papers/CTIC_WetCompression_Shepherd_ASMETurb oExpo2011.pdf , 22 pgs.

Luby, P. et al. (2003) "Zero Carbon Power Generation: IGCC as the Premium Option," Powergen International, 19 pgs.

MacAdam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.

Morehead, H. (2007) "Siemens Global Gasification and IGCC Update," Siemens, Coal-Gen, 17 pgs.

Nanda, R. et al. (2007) "Utilizing Air Based Technologies as Heat Source for LNG Vaporization," presented at the $86^{th}$ Annual convention of the Gas Processors of America (GPA 2007), San Antonio, TX; 13 pgs.

Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.

Reeves, S. R. (2003) "Enhanced Coalbed Methane Recovery," Society of Petroleum Engineers 101466-DL; SPE Distinguished Lecture Series, 8 pgs.

Richards, Geo A., et al. (2001) "Advanced Steam Generators," National Energy Technology Lab., Pittsburgh, PA, and Morgantown, WV; NASA Glenn Research Center (US).

Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.

Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.

van Hemert, P. et al. (2006) "Adsorption of Carbon Dioxide and a Hydrogen-Carbon Dioxide Mixture," Int'l Coalbed Methane Symposium (Tuscaloosa, AL) Paper 0615, 9 pgs.

Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

* cited by examiner

200

ENHANCED COAL-BED METHANE PRODUCTION

CROSS-REFERENCE TO RELATED APPLICATION

This application is the National Stage of International Application No. PCT/US2012/065656, filed Nov. 16, 2012, which claims the priority benefit of U.S. Patent Application No. 61/578,045 filed Dec. 20, 2011 entitled ENHANCED COAL-BED METHANE PRODUCTION the entirety of which is incorporated by reference herein.

FIELD OF THE INVENTION

Exemplary embodiments of the present techniques relate to techniques for enhancing the production of coal bed methane through injection of diluent from a gas turbine operating in a semi-closed Brayton cycle.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Coal deposits may hold significant amounts of hydrocarbon gases, such as methane, ethane, and propane, generally adsorbed onto the surface of the coal. A significant amount of natural gas reserves exists as adsorbed species within coal beds or as free gas within fractures (cleats) in the coal. The natural gas from coal beds, commonly referred to as "coalbed methane" (CBM), currently constitutes a major source of the natural gas production in the United States. Open fractures in the coal (called the cleats) can also contain free gas or can be saturated with water. Coal bed methane is often produced by reducing pressure, which reduces the partial pressure of methane in the cleats and causes desorption of methane from the coal. This pressure reduction can be performed by dewatering the coal bed. This, however, requires water handling and disposal.

Further, even using well stimulation methods, such as cavitation (see, for example, U.S. Pat. No. 5,147,111), only a small fraction of the CBM is economically recoverable. More specifically, depressurization is limited to higher permeability coal beds. This is because as pressure is decreased, coal cleats (i.e., natural fractures) may collapse and decrease the permeability of the coalbed. Loss of permeability is particularly a concern for deep coal beds, which may have a low initial permeability. Depressurization may also result in production of low-pressure gas needing significant power for compression to permit pipelining to market.

As an alternative to, or in conjunction with, depressurization, improved recovery of CBM may be obtained by injecting another gas into the coalbed. For example, $CO_2$ may be used to enhance the production of CBM (see, for example, U.S. Pat. Nos. 4,043,395; 5,085,274; and 5,332,036). $CO_2$ more strongly adsorbs to the coal than CBM and, thus, may displace adsorbed CBM. In other applications, nitrogen ($N_2$), which less strongly adsorbs onto coal than CBM, may be used (see, for example, U.S. Pat. Nos. 5,014,785; 5,566,756; Scott R. Reeves, "Geological Sequestration of $CO_2$ in Deep, Unmineable Coalbeds: An Integrated Research and Commercial-Scale Field Demonstration Project," SPE 71749 (Society of Petroleum Engineers, 2001); and Jichun Zhu, et al., "Recovery of Coalbed Methane by Gas Injection," SPE 75255 (Society of Petroleum Engineers, 2002). $N_2$, and other less strongly adsorbing gases, lower the partial pressure of the CBM components in the bulk gas phase, which causes the CBM to desorb from the coal. Both of these methods can maintain the coalbed at relatively high pressures and hence aid permeability by keeping the cleat system open.

Other gases have also been described as enhancing production of coalbed methane or modifying coal beds for other purposes. For example, U.S. Patent Publication No. 2007/0144747 describes a process for pretreating an underground coal bed to enhance the potential for carbon dioxide sequestration. The method involves injecting hydrogen into an underground coal bed, wherein the hydrogen is at a temperature below about 800° C.; extracting hydrogen and methane from the coalbed; separating the hydrogen and methane; delivering the methane as a product of the process; and injecting the separated hydrogen into the deposit to continue the process. When the sequestration of carbon dioxide is desired, hydrogen may be optionally produced from methane and carbon dioxide may optionally be injected for sequestration.

The methods above are generally limited by the availability of the gas in sufficient amounts for injection. Larger amounts of injection gas may be generated by coupling a power plant to the injection process, wherein sequestration of the exhaust gases occurs in tandem with the production of energy. For example, in S. Reeves, "Enhanced Coalbed Methane Recovery," presented in the SPE Distinguished Lecture Series, Society of Petroleum Engineers, 101466-DL (2003), the author discusses test projects for enhancing the production of coalbed methane from deep coal seams. The enhancement in the production of coal bed methane is related to adsorption isotherms. For example, $N_2/CH_4$ adsorption ratio is around 0.5/1, i.e., one unit of methane is adsorbed for every 0.5 units of nitrogen. In the case of $CO_2$, $CO_2/CH_4$ adsorption ratio is 2/1, i.e., one unit of methane is adsorbed for every two units of $CO_2$. In one project, $N_2$ was used to lower the partial pressure of methane in cleats in the coal, enhancing the desorption of methane from the coal. Another project discussed was the use of $CO_2$ from a pipeline to enhance production and sequester $CO_2$ in the coalbed. The sources discussed for the $N_2$ and $CO_2$ were commercial pipelines in the region of the fields. The author does not discuss the isolation process used to generate the injection gases, or the use of mixed streams of $N_2$ and $CO_2$ for the injection.

In U.S. Patent Application Publication No. 2010/0326084, by Anderson, et al., a method for power generation using a low heating value fuel is disclosed. In the method, an oxy-combustor is used to combust oxygen with a gaseous low heating value fuel. A compressor upstream of the combustor compresses the fuel. The combustor produces a drive gas including steam and carbon dioxide as well as other non-condensable gases, which pass through a turbine to output power. The drive gas can be recirculated to the combustor, either through the compressor, the oxygen inlet or directly to the combustor. Recirculation can occur before or after a condenser for separation of a portion of the water from the carbon dioxide. Excess carbon dioxide and steam is collected from the system. The turbine, combustor, and compressor can be derived from an existing gas turbine with fuel and air/oxidizer lines swapped. The excess carbon dioxide can be sequestered, for example, by use in enhanced oil recovery, enhanced natural gas recovery, or in enhanced coalbed methane recovery.

However, in the application described above, the oxygen supply for the combustor is provided by an air separation unit (ASU) or any other system capable of providing a substantially pure oxygen stream. The application does not disclose the use of air as an oxidizer and, thus, does not disclose the generation or use of a combined $N_2$ and $CO_2$ stream.

In addition to supply issues, the cost of separation to isolate gases, for example, by a swing adsorption process or a cryogenic air separation unit from either the atmosphere or produced gases may be prohibitively expensive. Further, after separation, the gases may need substantial compression, e.g., 2500 psia or more depending on subsurface depth, for injection into a formation. Thus, techniques for improving the enhanced recovery of coal bed methane would be valuable.

Other related material may be found in at least U.S. Patent Publication No. 2005/0201929, U.S. Pat. Nos. 5,402,847; 6,412,559; and 7,491,250, and P. van Hemert, et al., "Adsorption of carbon dioxide and a hydrogen-carbon dioxide mixture," 2006 International Coalbed Methane Symposium (Tuscaloosa, Ala., May 22-26, 2006), Paper 0615.

SUMMARY

An embodiment described herein provides a method for enhanced recovery of coalbed methane. The method includes generating a gas mixture including $N_2$ and $CO_2$ in a semi-closed Brayton cycle power plant. At least a portion of the gas mixture is injected into a coal bed and a mixed production gas including methane is recovered from the coal bed.

Another embodiment provides a system for enhancing the recovery of coalbed methane. The system includes a semi-closed Brayton cycle power plant, wherein an exhaust gas from the semi-closed Brayton cycle power plant provides a diluent gas mixture including substantial amounts of $N_2$ and $CO_2$. An injection well is configured to inject the diluent gas mixture from the semi-closed Brayton cycle power plant into a coalbed. A production well is configured to harvest a production gas mixture from the coal bed, wherein the production gas mixture includes methane.

Another embodiment provides a system for enhancing the recovery of coalbed methane. The system includes a gas turbine configured to operate at a substantially stoichiometrically balanced condition, wherein cooling is provided by a diluent gas injected into a combustor, and wherein the diluent gas substantially includes $N_2$ and $CO_2$. A generator is configured to convert mechanical energy provided by the gas turbine into electrical energy. A heat recovery steam generator (HRSG) is configured to generate steam by heating a boiler with an exhaust stream from the gas turbine. A Rankine cycle power plant is configured to generate electricity from the steam. A cooler is configured to condense water from the exhaust stream downstream of the HRSG, generating the diluent. A diluent compressor is configured to increase the pressure of the diluent and direct at least a portion of the diluent to the combustor. An injection system is configured to inject a portion of the diluent from the compressor into a coalbed and a production system is configured to harvest a production gas from the coalbed, wherein the production gas includes methane.

BRIEF DESCRIPTION OF THE DRAWINGS

The advantages of the present techniques are better understood by referring to the following detailed description and the attached drawings, in which.

DETAILED DESCRIPTION

Figure 1:
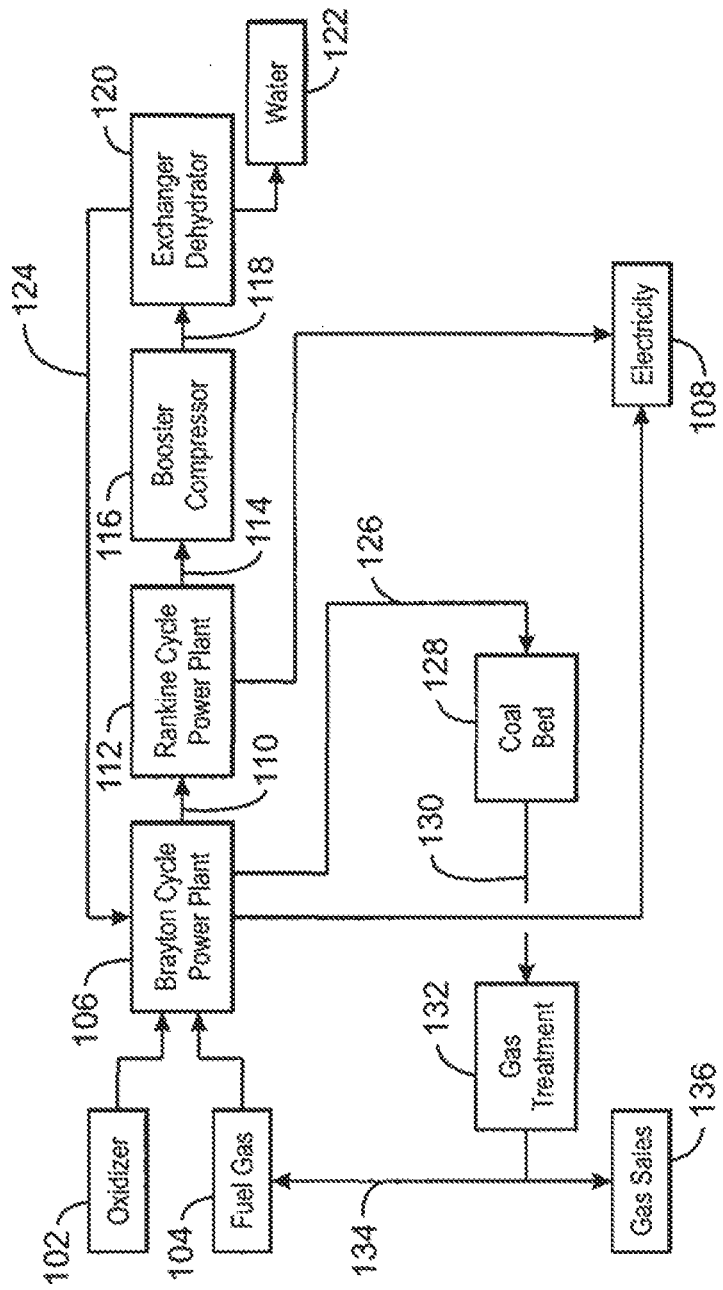
FIG. 1 is a block diagram of a system for using a diluent gas mixture of $CO_2$ and $N_2$ from a power plant in enhanced coalbed methane recovery.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

An "adsorbent material" is any material or combination of materials capable of adsorbing gaseous components. For example, an adsorbent material discussed herein is a natural coal bed, as discussed further below. Other material could include for examples zeolites.

"Adsorption" refers to a process whereby certain components of a mixture adhere to the surface of solid bodies that it contacts. This process is generally reversible.

A "combined cycle power plant" (CCPP) includes a gas turbine, a steam turbine, a generator, and a heat recovery steam generator (HRSG), and uses both steam and gas turbines to generate power. The gas turbine operates in an open Brayton cycle, and the steam turbine operates in a Rankine cycle. Combined cycle power plants utilize heat from the gas turbine exhaust to boil water in the HRSG to generate steam. The steam generated is utilized to power the steam turbine. After powering the steam turbine, the steam may be condensed and the resulting water returned to the HRSG. The gas turbine and the steam turbine can be utilized to separately power independent generators, or in the alternative, the steam turbine can be combined with the gas turbine to jointly drive a single generator via a common drive shaft. These combined cycle gas/steam power plants generally have higher energy conversion efficiency than Rankine-cycle or steam-only power plants. Currently, simple-cycle plant efficiency can exceed 44% while combined cycle plant efficiency can exceed 60%. The higher combined cycle efficiencies result from synergistic utilization of a combination of the gas turbine with the steam turbine.

"Coal" is generally a solid hydrocarbon, including, but not limited to, lignite, sub-bituminous, bituminous, anthracite, peat, and the like. The coal may be of any grade or rank. This can include, but is not limited to, low grade, high sulfur coal that is not suitable for use in coal-fired power generators due to the production of emissions having high sulfur content.

"Coal bed methane" or CBM is natural gas that is adsorbed onto the surface of coal. CBM may be substantially comprised of methane, but may also include ethane, propane, and other hydrocarbons. Further, CBM may include some amount of other gases, such as carbon dioxide ($CO_2$), nitrogen ($N_2$), and $H_2S$, among others.

A "compressor" is a machine that increases the pressure of a gas by the application of work (compression). Accordingly, a low pressure gas (e.g., 5 psig) may be compressed into a high-pressure gas (e.g., 1000 psig) for transmission through a pipeline, injection into a well, or other processes.

A "dehydration device" is a device for removing water, in gaseous or liquid form, from a gas mixture. "Dewatered" describes broadly any reduction of water content. Typically, a dewatered hydrocarbon-containing material can have a majority of the water content substantially removed, e.g., less than about 5% by volume water or less than about 1% depending on the particular material and starting water content. Water contents much less than 1% may be desirable for certain gas streams.

"Enriched" as applied to any stream withdrawn from a process means that the withdrawn stream contains a concentration of a particular component that is higher than the concentration of that component in the feed stream to the process.

A "facility" is a representation of a tangible piece of physical equipment through which hydrocarbon fluids are either produced from a reservoir or injected into a reservoir. In its broadest sense, the term facility is applied to any equipment that may be present along the flow path between a reservoir and its delivery outlets, which are the locations at which hydrocarbon fluids either enter the reservoir (injected fluids) or leave the reservoir (produced fluids). Facilities may comprise production wells, injection wells, well tubulars, wellhead equipment, gathering lines, manifolds, pumps, compressors, separators, surface flow lines, and delivery outlets. As used herein, a facility may also include a gas treatment unit, such as an acid gas separation unit, a cryogenic separation system, or a dehydration unit. In some instances, the term "surface facility" is used to distinguish those facilities other than wells. A "facility network" is the complete collection of facilities that are present in the system, which would include all wells and the surface facilities between the wellheads and the delivery outlets.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon although nitrogen, sulfur, oxygen, metals, or any number of other elements may be present in small amounts. As used herein, hydrocarbons generally refer to organic materials that are harvested from hydrocarbon containing sub-surface rock layers, termed reservoirs. For example, natural gas, oil, and coal are hydrocarbons.

"Hydrocarbon production" or "production" refers to any activity associated with extracting hydrocarbons from a well or other opening. Hydrocarbon production normally refers to any activity conducted in or on the well after the well is completed. Accordingly, hydrocarbon production or extraction includes not only primary hydrocarbon extraction but also secondary and tertiary production techniques, such as injection of gas or liquid for increasing drive pressure, mobilizing the hydrocarbon or treating by, for example chemicals or hydraulic fracturing the well bore to promote increased flow, well servicing, well logging, and other well and wellbore treatments.

The term "natural gas" refers to a gas obtained from a crude oil well (associated gas), from a subterranean gas-bearing formation (non-associated gas), or from a coal bed. The composition and pressure of natural gas can vary significantly. A typical natural gas stream contains methane ($CH_4$) as a significant component. Raw natural gas may also contain ethane ($C_2H_6$), higher molecular weight hydrocarbons, acid gases (such as carbon dioxide, hydrogen sulfide, carbonyl sulfide, carbon disulfide, and mercaptans), and contaminants such as water, nitrogen, iron sulfide, wax, and crude oil.

"Pressure" is the force exerted per unit area by the gas on the walls of the volume. Pressure can be shown as pounds per square inch (psi).

As used herein, a "Rankine cycle power plant" includes a vapor generator, a turbine, a condenser, and a recirculation pump. For example when the vapor is steam, a "Rankine cycle power plant" includes a steam generator, a steam turbine, a steam condenser, and a boiler feedwater pump. The steam generator is often a gas fired boiler that boils water to generate the steam. However, in embodiments, the steam generator may be a geothermal energy source, such as a hot rock layer in a subsurface formation. The steam is used to generate electricity in the steam turbine generator, and the reduced pressure steam is then condensed in the steam condenser. The resulting water is recirculated to the steam generator to complete the loop.

"Reservoir formations" or "reservoirs" are typically pay zones include sandstone, limestone, chalk, coal and some types of shale. Pay zones can vary in thickness from less than one foot (0.3048 m) to hundreds of feet (hundreds of m). The permeability of the reservoir formation provides the potential for production.

"Sequestration" refers to the storing of a gas or fluid that is a by-product of a process rather than discharging the fluid to the atmosphere or open environment. For example, as described herein, carbon dioxide gas formed from the burning or steam reforming of hydrocarbons may be sequestered in underground formations, such as coal beds.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

"Well" or "wellbore" refers to a hole in the subsurface made by drilling or insertion of a conduit into the subsurface. The terms are interchangeable when referring to an opening in the formation. A well may have a substantially circular cross section, or other cross-sectional shapes. Wells may be cased, cased and cemented, or open-hole well, and may be any type, including, but not limited to a producing well, an injection well, an experimental well, and an exploratory well, or the like. A well may be vertical, horizontal, or any angle between vertical and horizontal (a deviated well), for example a vertical well may comprise a non-vertical component.

Overview

Embodiments described herein provide methods for supplying a diluent gas mixture to a coal bed for the enhanced recovery of coal bed methane. The diluent gas mixture can include substantial amounts of $N_2$ and $CO_2$, which is generated from the exhaust stream of a semi-closed Brayton cycle power plant. The diluent gas mixture can be used as an injection gas for enhancing a recovery of methane from a coal bed. The semi-closed Brayton cycle generator is used to provide power in addition to the diluent gas mixture.

As noted above, lab studies indicate that coal adsorbs nearly twice as much volume of carbon dioxide as methane. The higher carbon dioxide adsorptivity forces more methane to be released while keeping carbon dioxide sequestered in coal beds. On the other hand, nitrogen has lower adsorptivity compared to methane and remains relatively free in the coal structure, i.e., in cleats or fractures in the coal. This larger quantity of free nitrogen reduces the partial pressure of methane in the cleats, resulting in an increased release of methane. Studies have indicated that for each volume of nitrogen that is injected, two volumes of methane are produced, while for $CO_2$ injection one volume of methane is released for every two volumes of $CO_2$ injected.

However, there are two issues associated with enhanced CBM recovery as currently performed. When using carbon dioxide injection in the enhanced CBM process, maintaining injectivity is a challenge, since the $CO_2$ adsorption may swell the coal, leading to closure of the cleats. Further, the use of nitrogen for enhanced CBM suffers from early breakthrough and reproduction of $N_2$.

In some embodiments described herein, this issue is addressed by using a $N_2/CO_2$ diluent gas mixture, in which the injection of $N_2$ provides rapid early recovery and the coinjection of $CO_2$ provides better displacement in later stages. Further, the cost of acquiring either substantially pure $CO_2$ or substantially pure $N_2$ for current injection processes may be uneconomical. For example, capturing $CO_2$ from the exhaust of a standard power plant exhaust is very expensive. The same is true for producing nitrogen via air separation or other means. Thus, a mixed $N_2/CO_2$ injection stream may provide a potential synergy for both issues. A semi-closed Brayton cycle power plant can generate a mixed $N_2/CO_2$ gas by using a stoichiometric ratio between oxygen and fuel, in which the oxygen is supplied by air. The resulting gases will predominately be a mixture of $N_2$ and $CO_2$.

Accordingly, a dedicated natural gas combined-cycle power plant can supply both electricity for hydrocarbon production from a coal bed and an injection gas for enhanced recovery. If other oil and gas fields are present, the power plant may also provide electricity and gases for enhanced oil recovery to those fields. The fuel for the power plant fuel can be supplied from the gas production, for example, as a portion of the gas harvested from the coal bed. Waste heat from power generation may be provided to oil and gas facilities. The power plant exhaust gas is treated, cooled, and compressed for use as a diluent in the power plant, and for use in enhanced hydrocarbon recovery (EHR).

FIG. 1 is a block diagram of a system 100 for using a diluent gas mixture of $CO_2$ and $N_2$ from a power plant in enhanced coalbed methane recovery. In the system 100, oxidizer 102 and fuel gas 104 are provided to a semi-closed Brayton cycle power plant 106, for example, using a gas turbine generator (GTG), at a substantially stoichiometric ratio. The oxidizer 102 can be air having about 70% $N_2$ and about 21% oxygen and, thus, the ratio would be calculated between the fuel gas 104 and the oxygen portion of the oxidizer 102. The fuel gas 104 and oxygen are substantially completely combusted in the GTG of the semi-closed Brayton cycle power plant 106 to form an exhaust that includes $N_2$, $CO_2$, and $H_2O$, as well as trace amounts of CO, $O_2$, and fuel. The energy from the exhaust is used to drive a turbine expander that turns a shaft. A generator coupled to the shaft generates electricity 108.

The exhaust stream 110 from the turbine expander of the gas turbine generator 106 can be used to boil water, or other heat transfer fluids, in a heat recovery steam generator (HRSG) that can be used to power a Rankine cycle power plant 112. In the Rankine cycle power plant 112, the steam, or other vapor, can be used to drive a turbine and generate more electricity 108. The cooled, lower pressure, gas stream 114 can be dehydrated and fed to a booster compressor 116 to be pressurized, or may be fed directly to the booster compressor 116 before dehydration. The pressurized stream 118 from the booster compressor 116 can be cooled or chilled in a heat exchanger 120 to condense and remove water 122.

The treated stream forms the diluent gas mixture 124 which may be returned to the semi-closed Brayton cycle power plant 106 for compression by the gas turbine's axial compressor. The compressed diluent gas is fed to a combustor in place of a portion of the fuel gas 104 and oxidizer 102, cooling the combustor and allowing the use of a stoichiometric ratio between the reactants without overheating the combustor. The recycling of the diluent gas mixture 124 completes the semi-closed Brayton cycle. After compression, a portion of the diluent gas mixture 124 can be used as an injection gas 126, which is injected into a coal bed 128 to enhance the recovery of coal bed methane (CBM), as described herein. A produced gas mixture 130 from the coal bed 128 can be processed in a gas treatment facility 132 to remove excess non-condensable gases, such as nitrogen, and other impurities, such as $CO_2$, $H_2O$, $H_2S$, solids, and the like. The gas treatment facility 132 may include a compressor to boost the pressure of the resulting gas 134 before sending the gas to a gas sales facility 136 for sales by pipeline, or returning a portion to the semi-closed Brayton cycle power plant 106 as the fuel gas 104. The gas sales facilities 136 can be used to measure and further compress the gas for sale. Further, the gas sales facility 136 may include a gas liquefaction plant to produce liquefied natural gas (LNG) for shipment by tanker.

Figure 2:
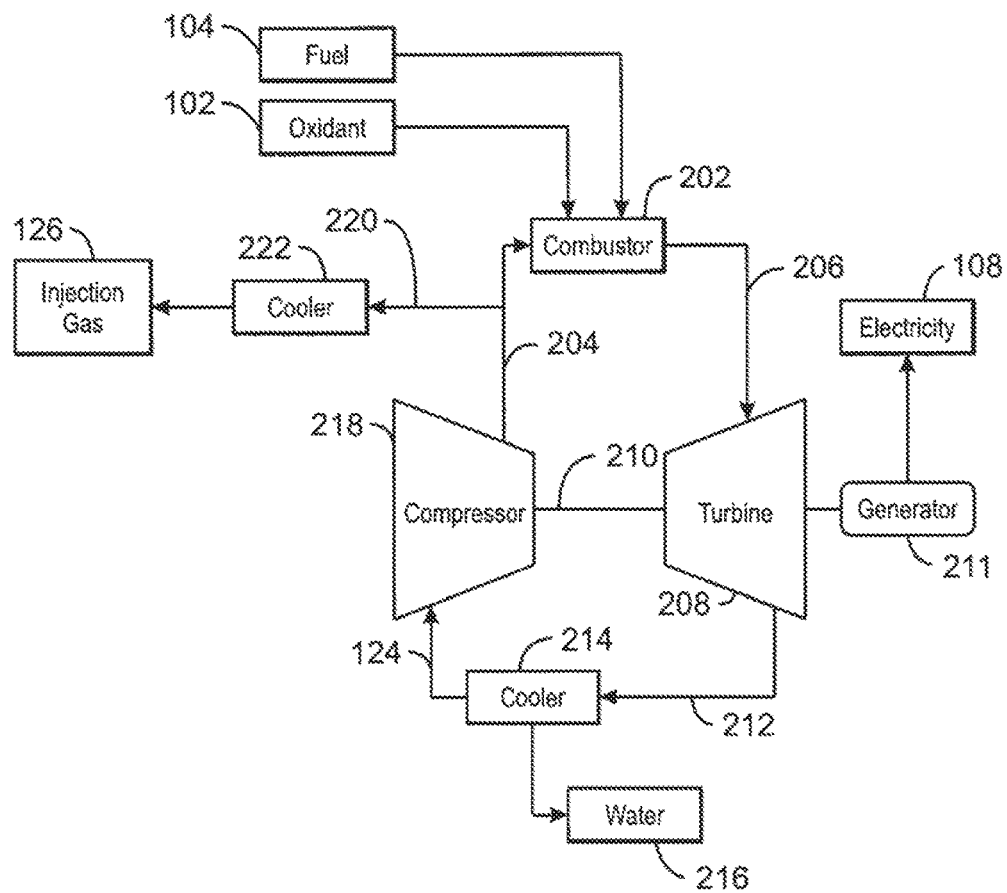
FIG. 2 is a schematic diagram of a simple-cycle, semi-closed Brayton power plant utilizing a gas turbine generator that can be used to supply a diluent gas mixture for enhanced recovery of coal bed methane.

FIG. 2 is a schematic diagram of a simple-cycle, semi-closed Brayton power plant 200 utilizing a gas turbine generator that can be used to supply a diluent gas mixture 126 for enhanced recovery of coal bed methane. Like number items are as described with respect to FIG. 1. In this example, the Rankine cycle power plant 112 (FIG. 1) has been omitted to simplify the figure. The oxidant 102 and fuel gas 104 are fed to a combustor 202 to be burned. A compressed diluent stream 204 is also fed to the combustor 202 to lower the total amount of fuel gas 104 and oxidant 102, allowing the combustion process to be run at near stoichiometric conditions without overheating. As a result, the amount of $O_2$ and CO generated in the combustion process is decreased, and the hot exhaust gases 206 include mostly $CO_2$, $H_2O$, and $N_2$, in addition to some trace gases.

The oxidant 102 and fuel gas 104 pressures may be increased, for example, using compressors, to boost the pressure to match the injection pressure of the compressed diluent stream 204 at the combustor 202. The hot gases 206 from the combustor 202 are passed to a turbine 208, which uses the energy of the hot gases 206 to spin a shaft 210. The shaft 210 provides energy to an electric generator 211 to generate the electricity 108. The electric generator 211 does not have to be directly coupled to the shaft 210 from the turbine 208, but may instead be coupled to the shaft 210 by a gear box, clutch, or other device.

From the turbine 208, the hot gas stream 212 is passed to a cooler 214. The cooler 214 chills the hot gas stream 212, causing the water vapor to condense out, allowing its removal as a separate water stream 216. In this embodiment, the cooler 214 may correspond to the heat exchanger/dehydrator 120 and the water stream 216 may correspond to the water 122 of FIG. 1. After removal of the water 216, the diluent gas mixture 124 is provided to a compressor 218 for recompression, prior to feeding the compressed diluent stream 204 to the combustor 202 to help in cooling the combustor 202. The recycling of the diluent gas mixture 124 partially closes the Brayton cycle in the simple-cycle, semi-closed Brayton power plant 200, resulting in a semi-closed Brayton cycle. As fuel gas 104 and oxidant 102 are continuously being fed to the simple-cycle, semi-closed Brayton power plant 200 to maintain the combustion, a portion 220 of the diluent gas mixture 124 is continuously removed. This portion 220 can be fed through a cooler 222 to remove the heat of compression, generating the injection gas 126, which can be used to enhance the recovery of coal bed methane. If the demand for the injection gas 126 is lower than the corresponding amount of oxidant 102 and fuel gas 104 injected into the simple-cycle, semi-closed Brayton power plant 200, excess gases may be vented, sent to a separator, provided to customers in a pipeline, and the like.

Figure 3:
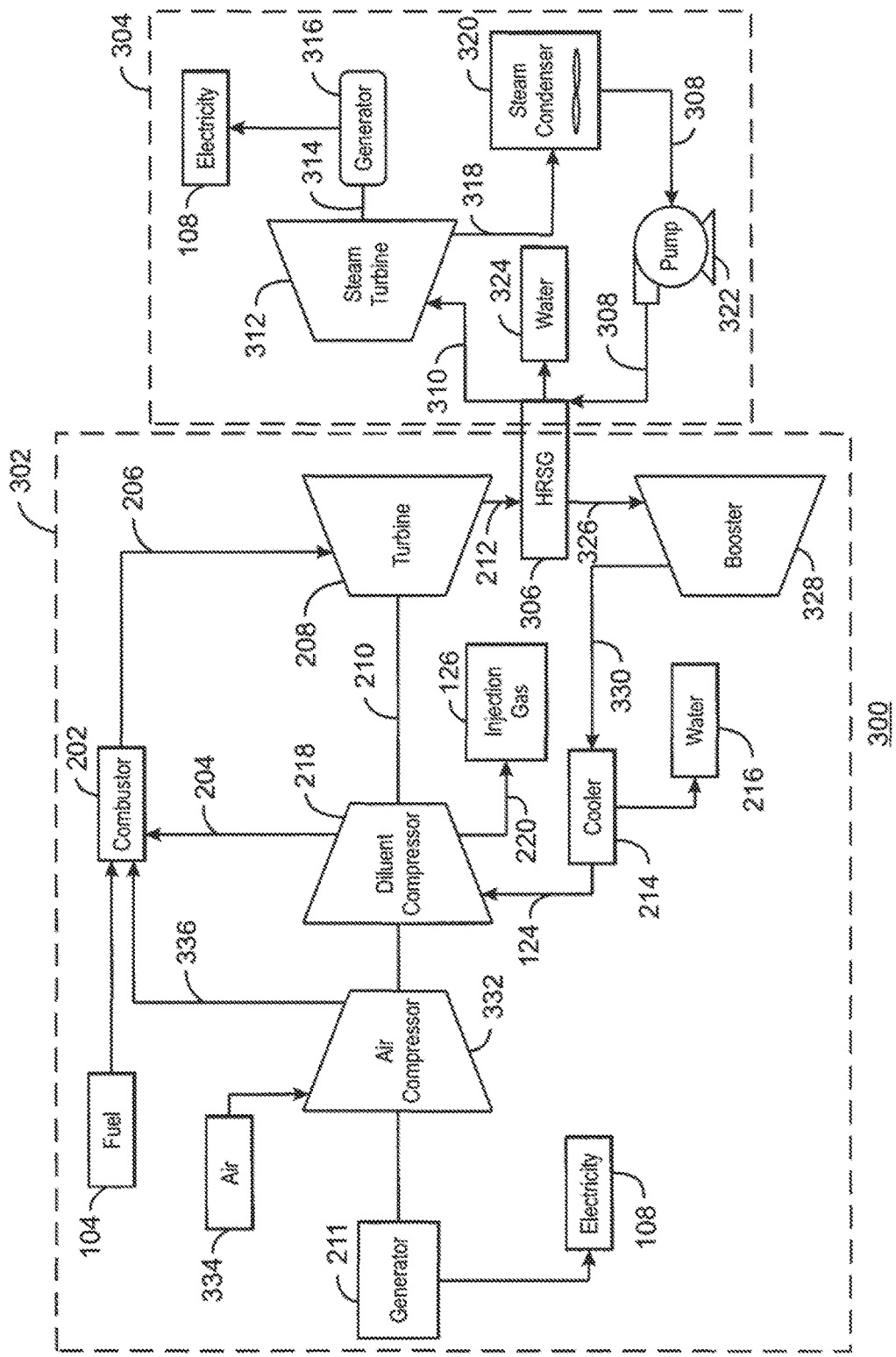
FIG. 3 is a schematic diagram of a combined-cycle, semi-closed Brayton power plant (CSBPP) that can be used to provide a diluent gas mixture for enhanced recovery of coal bed methane.
Figure 4:
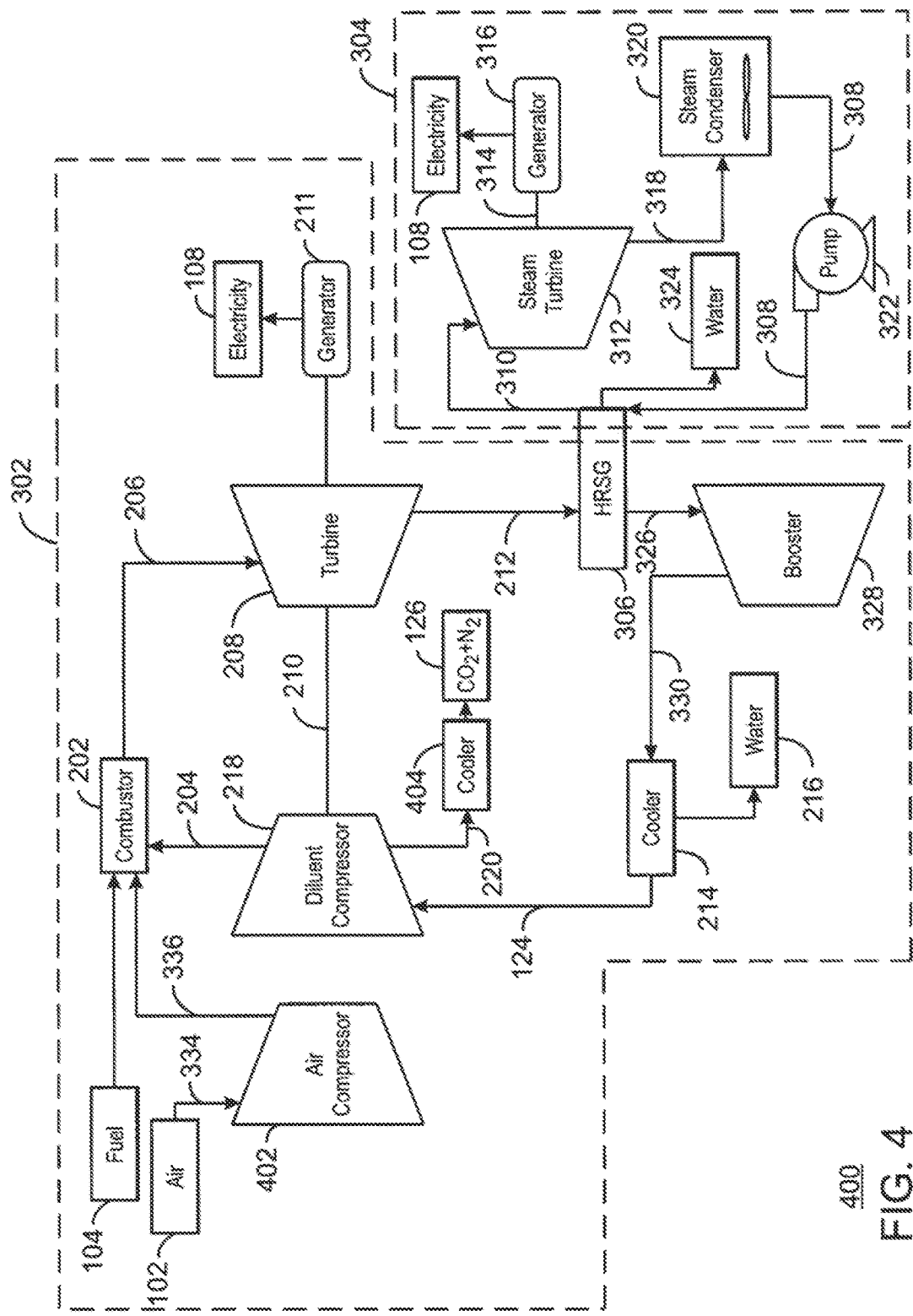
FIG. 4 is a schematic diagram of another combined cycle, semi-closed Brayton cycle power plant (CSBPP) that can be used to provide a diluent gas mixture for enhanced recovery of coal be methane.
Figure 5:
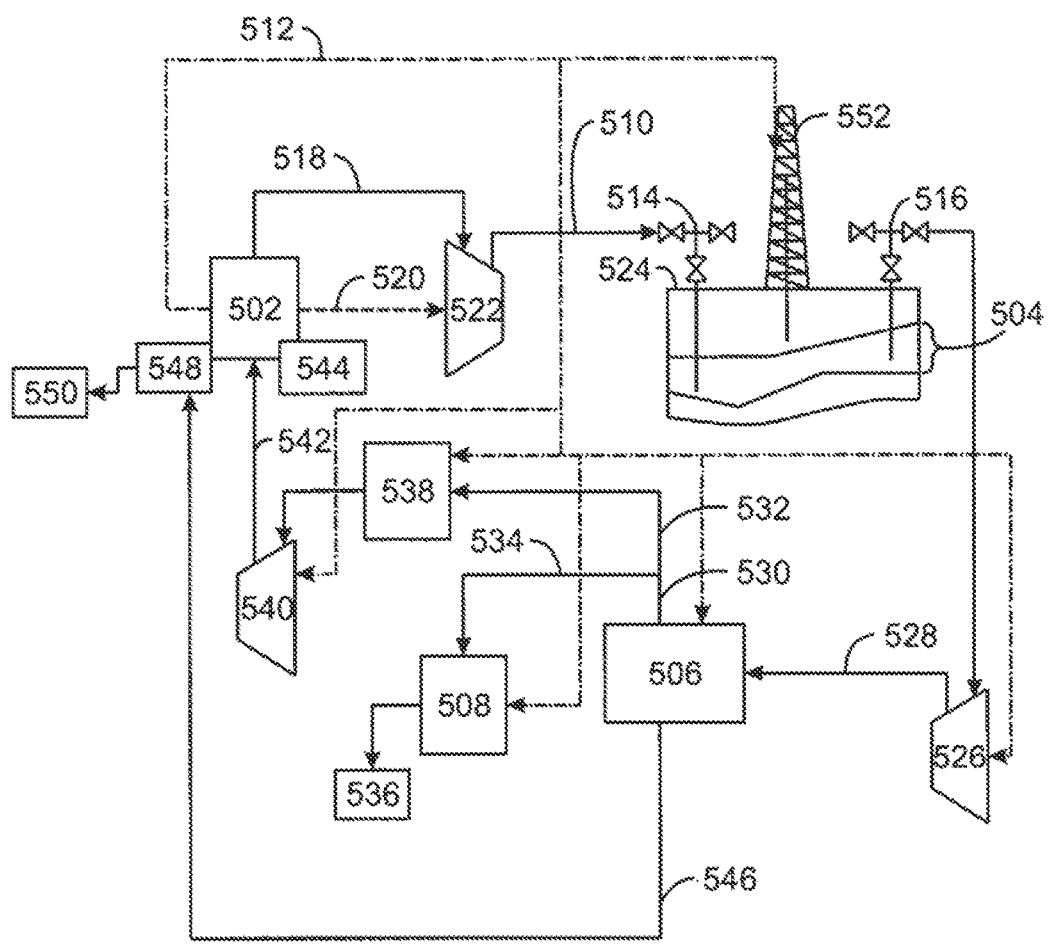
FIG. 5 is a schematic diagram of an exemplary enhanced coal bed methane recovery (ECBM) system.

Many options are available to increase the level of integration between the power generation process, hydrocarbon production facilities, and coal beds, as discussed further with respect to FIGS. 3-5. Increased integration may improve overall system efficiency or reliability while reducing greenhouse gas emissions. For example, a coal bed can provide fuel gas 104 for the combustor 202 on the simple-cycle, semi-closed Brayton power plant 200. A steam Rankine cycle, for example, using a HRSG, can be added to the power plant to increase the power produced and reduce the size the working fluid cooler. A water desalination process can be added to the power plant to reduce the size the working fluid cooler and produce clean water. Water produced with the gas from the coal bed is used as a feedstock for the desalination process. The power plant can be used to provide steam, heat, or electric power for the processing, treating, or refining hydrocarbons from the coal bed or a nearby reservoir. Water produced from working fluid condensation or desalination is used for well drilling, fracturing, processing, treating, or refining hydrocarbons.

FIG. 3 is a schematic diagram of a combined-cycle, semi-closed Brayton power plant (CSBPP) 300 that can be used to provide a diluent gas mixture for enhanced recovery of coal bed methane. Like numbered items are as discussed with respect to FIGS. 1 and 2 above. The CSBPP 300 has a semi-closed Brayton power plant 302, coupled to a Rankine cycle power plant 304. In this arrangement, the semi-closed Brayton power plant 302 will usually be considered the prime mover, i.e., the largest self powered equipment in the system.

In the CSBPP 300, the hot gas stream 212 from the turbine 208 is passed through a heat-recovery steam generator (HRSG) 306. The HRSG 306 uses the heat from the hot gas stream 212 to boil a water stream 308 and generate a steam stream 310. In the Rankine cycle power plant 304, the steam stream 310 is fed to a steam turbine 312 which converts some of the energy of the steam stream 310 to mechanical energy. The mechanical energy drives a shaft 314, which powers a generator 316. The generator 316 can provide electricity 108 to a plant power grid in addition to the electricity 108 generated by the generator 211 in the semi-closed Brayton power plant 302. The remaining low pressure steam 318 is sent to a steam condenser 320 to be recondensed into the water stream 308, which is returned to the HRSG 306 by a pump 322. The steam condenser 320 may be a cooling tower, heat exchanger, or other device configured to harvest heat energy while condensing the steam. In an embodiment, the steam condenser 320 is a heat exchanger providing energy to boil an organic fluid, which may be used to provide more energy in an organic Rankine cycle. The HRSG 306 may also condense water 324 from the hot gas stream 212, which can be combined with the water stream 216 from the cooler 214.

The cooled gas stream 326 from the HRSG 306 may have a substantially lower pressure than the hot gas stream 212. Accordingly, a booster compressor 328 can be used to increase the pressure. The high pressure stream 330 from the booster compressor 328 is passed through the cooler 214, and returned to the diluent compressor 218 as the diluent gas mixture 124. In the embodiment shown, an air compressor 332 is used to increase the pressure of an air stream 334, prior to feeding the high pressure air stream 336 to the combustor 202. The high pressure air stream 336 acts as the oxidizer 102 (FIG. 1) and reacts with the fuel gas 104 in the combustor 202.

The CSBPP 300 may be a single or a multi-shaft system. In a single shaft system, the shaft 210 in the semi-closed Brayton power plant 302 and the shaft 314 of the Rankine cycle power plant 304 are a single contiguous shaft with all units operating in tandem. The single-shaft arrangement has increased operating simplicity and higher reliability than multi-shaft blocks. In some configurations, the steam turbine 312 and generator 316 of the Rankine cycle power plant 304 can be decoupled, for example, using a hydraulic clutch, during startup or for simple-cycle operation of the semi-closed Brayton power plant 302. In other embodiments, the shaft 210 of the semi-closed Brayton power plant 302 may be separate from the shaft 314 of the Rankine cycle power plant 304. In multi-shaft systems, one or more semi-closed Brayton power plants 302 may use individual HRSGs 306 to supply steam through a common header to a Rankine cycle power plant 304. Further, the booster compressor 328 may be located on a shaft with the other units, or may be a separate compressor powered by mechanical energy from the shaft or electrical energy, for example, from the generators.

Fuel treatment processes may be used to modify the fuel gas 104 to meet the requirements of the prime movers, e.g., the gas turbine generator of the semi-closed Brayton power plant 302. Prime movers operate safely and reliably within defined ranges for fuel components that will allow acceptable prime mover performance. Typical requirements for gas turbines include limits for heating value, Wobbe Index, contaminants (for example, water, oils, hydrogen sulfide, carbon dioxide, nitrogen, etc), dew point, solid particle sizes, hydrogen and carbon monoxide. If the fuel gas source has a composition outside these ranges a fuel treatment process can be used to achieve the desired composition.

Fuel compressors are often used to increase the pressure of the fuel gas to optimize operation of the prime movers. Prime movers operate safely and reliably within a defined range of fuel pressure that will allow acceptable prime mover performance. If the fuel gas source is below this range a gas compressor is used to raise the pressure to the desired level. The minimum requirement for gas turbines depends on the pressure ratio and design of the gas turbine, for example, this may range from 10 bar to 60 bar. Gas scrubbers and coolers may be used with multiple stages of compressors to achieve higher pressure ratios.

FIG. 4 is a schematic diagram of another combined cycle, semi-closed Brayton cycle power plant (CSBPP) 400 that can be used to provide a diluent gas mixture for enhanced recovery of coal be methane. Like numbered items are as described with respect to FIGS. 1-3. Any number of different equipment variations may be used as illustrated by the CCPP 400 in FIG. 4. In this CCPP 400, an air compressor 402 that is independent of the shaft 210 in the semi-closed Brayton power plant 302 is used to generate the high pressure air stream 336. The separation from the shaft 210 allows the air compressor 402 to be powered by other means, such as electricity 108, mechanical couplings to the shaft 210 of the semi-closed Brayton power plant 302, mechanical couplings to the shaft 314 of the steam turbine 312, and the like. Further, the portion 220 of the compressed diluent stream 204 is passed through an independent cooler 404 to form the injection gas 126. These variations allow more flexibility in some embodiments, providing greater control over the CCPP 400, and over the injection gas 126.

As described herein, the semi-closed Brayton power plant 302 utilizes a thermodynamic process that uses a compressor 218, combustor 202, turbine 208 and cooler 214 (and HRSG 306 in some embodiments) to convert energy in the fuel gas 104 to mechanical power, driving the shaft 210. As noted, adding oxidant 102, for example, as high pressure air stream 336, and fuel 104 to the combustor 202 requires that some of the diluent gas mixture 124 or cooled exhaust gas 326 be bled out of the system to maintain a steady state mass balance. An electrical generator 211 may be coupled to the turbine 208 to generate electrical power 108, for example, for powering equipment associate with the gas production facility, including, for example, injection compressors, gas treating facilities, hydrocarbon sales facilities, a LNG liquefaction plant, equipment associated with production wells, injection wells, drilling, and the like. In some embodiments, the mechanical power generated may be used directly to perform other tasks for the field, such as powering compressors in an LNG plant.

FIG. 5 is a schematic diagram of an exemplary enhanced coal bed methane recovery system 500. The system 500 includes a semi-closed Brayton cycle power plant 502, coal bed 504, and hydrocarbon production facilities 506. In some embodiments, a liquefaction plant 508 may be used for LNG production. However, embodiments are not limited to the system shown, as those of skill in the art will recognize that any number of arrangements may be used to provide an injection gas 510 to a coal bed 504 using a semi-closed Brayton cycle power plant 502. Using hydrocarbon fuel and an oxygen-containing oxidant, the semi-closed Brayton cycle power plant 502 generates electrical power 512 and the injection gas 510, for example, including carbon dioxide and nitrogen. The electrical power 512 may be used in a plant grid to power any number of facilities, which may include compressors, purification systems, and measurement systems, among others. The injection gas 510 is injected into the coal bed 504 through an injection well 514. The injection enhances the liberation of methane from the coal, which can then be produced with a producing well 516.

The injection gas 510 is generated as an exhaust stream 518 from the semi-closed Brayton cycle power plant 502. Power 520 from the semi-closed Brayton cycle power plant 502, such as electricity or mechanical power, can be used to drive an injection compressor 522 to increase the pressure of the exhaust stream 518 prior to injection. Injection compressors 522 are often used to inject gas into subterranean formations, such as coal beds 504. The injection compressors 522 increase the pressure of the injection gas 510 to allow the injection gas 510 to overcome the pressure of the subterranean coal bed 504.

The injection well 514 is the conduit used to direct the gas from the surface 524 to the coal bed 504. The injection well 514 can include valves located near the surface 524 to control the well, pipes to convey the injection gas 510 below the surface 524, and pipe perforations to allow the injection gas 510 to leave the pipe and enter the coal bed. A cathodic protection system may be included to inhibit corrosion of the injection well 514. Injection wells 514 often have measurement equipment installed near the well head to track the amount, pressure, and temperature, among others, of the injection gas 510.

The production well 516 is used to produce gas from the coal bed 504. The production well 516 can include valves located near the surface 524 to control the production well 516. Pipes are used to convey the gas below the surface. Pipe perforations allow the produced gas to enter the pipe from the coal bed 504. As for the injection well 514, a cathodic protection system may be used to inhibit well corrosion in the production well 516. Water, and other liquids, may enter the production well 516 and artificial lift can be used to remove the liquids. Production wells 516 that are primarily for gas production will often have measurement equipment and may use a compressor 526 to boost the pressure of the produced gas.

The produced gas stream 528 may be passed to the production facilities 506. The production facilities 506 can include systems for heating produced fluids, separating liquids from gases, and for the injection of chemicals into the separated streams, among others. The chemicals can include corrosion inhibitors, emulsion breaking chemicals, hydrate inhibitors, and the like. Additionally, the production facilities 506 can include systems for measuring produced fluids, storing produced fluids, and pumping or compressing produced fluids.

A gas stream 530 from the production facilities 506 may be divided into a fuel stream 532 that is used to fuel the semi-closed Brayton cycle power plant 502 and a liquefaction feed stream 534. The liquefaction feed stream 534 can be passed to a liquefaction plant 508 and is used to produce LNG 536 as a product. In other embodiments, the gas can be sold directly to a pipeline without liquefaction, as described below. The fuel stream 532 can be sent to a treatment facility 538 to remove contaminants or improve the suitability of the fuel gas prior to use in the prime movers. A compressor 540 can be used to boost the pressure of the fuel gas 542 to enable injection into the combustors of the GTG 502.

Additional equipment may be included for enhanced production or efficiency. This equipment may include a Rankine cycle power plant 544. The Rankine cycle power plant 544 can use a heat recovery steam generator (HRSG) to cool the hot exhaust stream 518 associated with the power generation process, for example, boiling water to create stream. The steam from the HRSG can then be used in a Rankine cycle to generate electricity by turning a steam turbine to power a generator. The steam is recondensed and recycled to the HRSG. Other fluids may be used instead of or in addition to water. For example, an organic Rankine may be used to recover further energy from the steam after it leaves the steam turbine, for example, by vaporizing an organic solvent which can be used to power a second Rankine cycle. The heat from the HRSG may be used to at least partially supply process heat to the production facilities 506, gas treating facilities 538, equipment associated with production wells 516, injection wells 514, and the like.

A gas stream 546 from the production facilities 506 can be sent to a treatment facility 548, treated to pipeline quality, e.g., by the removal of acid gases, water vapor, and other contaminates and the addition of odorants or other compounds. The treated gas may then be provided to a market, for example, by a pipeline 550.

The system 500 may also include a drilling rig 552 and other equipment to create additional injection wells 514 or production wells 516. The equipment may include fracturing systems to increase the productivity of the wells 514 and 516. Well fracturing is a technique to improve the performance of a production well 516 or injection well 514 by using a high pressure fluid injection to create new fractures in a formation or open old fractures in the formation. When this technique is applied it typically requires large amounts of clean water. The water may be supplied by the water condensed from the exhaust 518, or may be obtained from desalination of water produced from the coal bed 504.

A desalination system may be incorporated into the HRSG or use steam from the Rankine cycle power plant 544. The desalination unit may use the heat from the exhaust stream 518 to power the desalination, e.g., by distilling produced water from the coal bed 504. As the system 500 described above is a single integrated unit, a single control system may be used to control the power generation, injection compressors, production facilities, hydrocarbon sales facilities, any equipment associated with production wells or injection wells, drilling equipment, and the like.

In some embodiments, further separation of input or output gases may be useful. For example, treatment equipment may reduce oxygen and carbon monoxide in the exhaust gas 518 to lower the amount of hydrocarbons lost to oxidation in the coal bed 504. Further, a nitrogen and carbon dioxide separation process may be used on the exhaust gas 518, to create a rich carbon dioxide stream and lean carbon dioxide stream. Such processes can include $CO_2$ frost, membrane separation, and cryogenic separation processes. The use of a $CO_2$ rich injection gas 510 may increase the efficiency of the process or reduce the cost of mitigating greenhouse gases. In an embodiment, an air separation unit (ASU) could be used to provide an oxidant stream with a higher concentration of oxygen than air. The high oxygen stream will lower the amount of nitrogen in the exhaust gas 518 and subsequently increase the amount of $CO_2$ in the injection gases 510.

Figure 6:
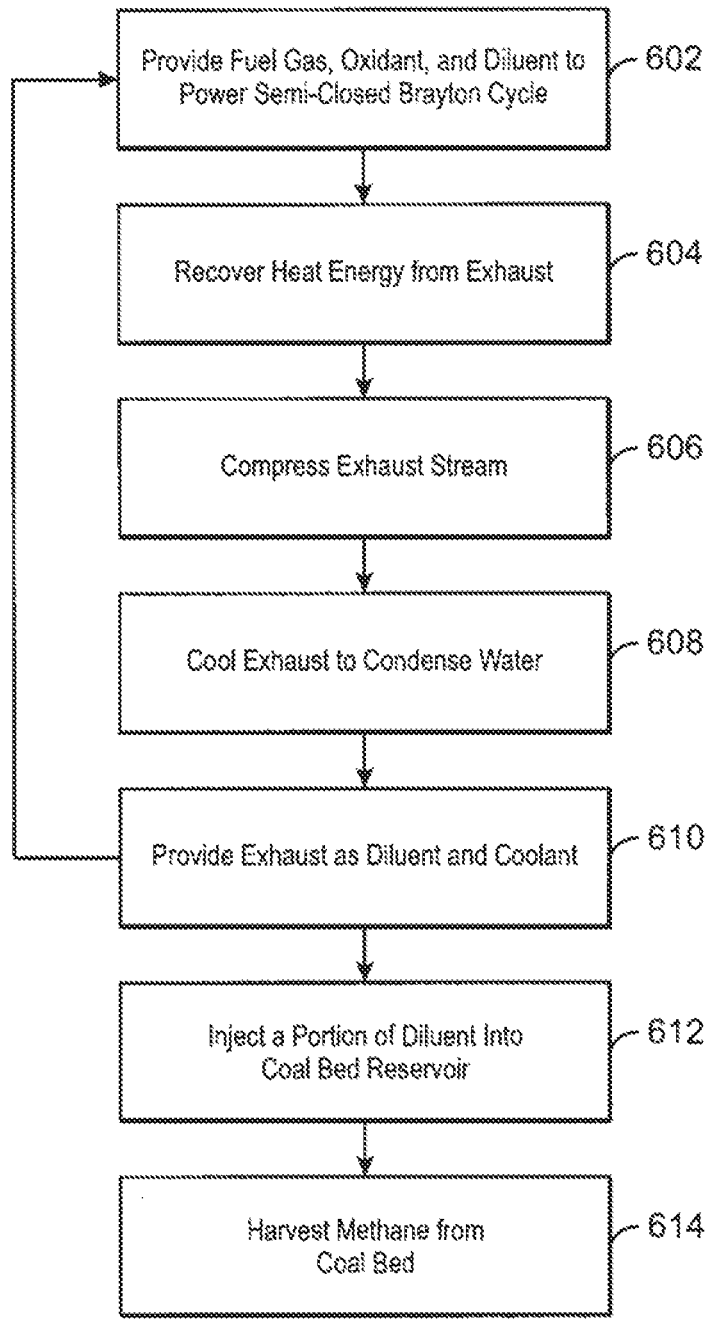
FIG. 6 is a process flow diagram of a method for using a diluent gas mixture to enhance the recovery of coal bed methane.

FIG. 6 is a process flow diagram of a method 600 for using a diluent gas mixture to enhance the recovery of coal bed methane. The method begins at block 602, when a fuel gas and oxidant are used to power a semi-closed Brayton cycle power plant. The fuel gas and oxidant are mixed with a diluent to provide cooling and lower the amount of oxidant used. At block 604, heat energy may be recovered from the exhaust of the semi-closed Brayton cycle power plant. This may be performed by using a HRSG to boil water and generate electricity using a steam turbine. At block 606, after the HRSG, the pressure of the exhaust stream from the semi-closed Brayton cycle power plant is boosted to allow injection into a combustor. At block 608, the pressurized exhaust stream is cooled to condense water out. The pressurized, dewatered exhaust stream is provided to the combustor as a diluent and coolant at block 610. At block 612, a portion of the diluent is injected into a coal bed reservoir. At block 614, coal bed methane is harvested from the reservoir.

Embodiments

Embodiments of the techniques described herein can include any combination of elements described in the following numbered paragraphs:

1. A method for enhanced recovery of coalbed methane, including:
  generating a gas mixture including $N_2$ and $CO_2$ in a semi-closed Brayton cycle power plant;
  injecting at least a portion of the gas mixture into a coal bed; and
  recovering a mixed production gas including methane from the coal bed.

2. The method of paragraph 1, including completing an injection well in a coal bed.

3. The methods of paragraphs 1 or 2, including completing a production well in a coal bed.

4. The methods of paragraph 1, 2, or 3, including compressing the gas mixture prior to injection.

5. The methods of any of the preceding paragraphs, including using at least a portion of the mixed production gas to fuel the semi-closed Brayton cycle power plant.

6. The methods of any of the preceding paragraphs, including recovering heat energy from the exhaust of the semi-closed Brayton cycle power plant in a heat recovery steam generator (HRSG).

7. The method of paragraph 6, including generating power with steam generated in the HRSG.

8. The methods of any of the preceding paragraphs, including processing the mixed production gas to generate a pipeline quality natural gas.

9. The method of paragraph 8, including liquefying the natural gas.

10. The methods of any of the preceding paragraphs, including compressing a gaseous fuel for use in the semi-closed Brayton cycle power plant.

11. The methods of any of the preceding paragraphs, including cooling the gas mixture prior to injection into the coal bed.

12. The method of paragraph 11, including recovering heat from the gas mixture to supply process heat to a facility.

13. The methods of any of the preceding paragraphs, wherein an oxidant for the semi-closed Brayton cycle power plant is air.

14. The methods of any of the preceding paragraphs, wherein the oxygen concentration used by an oxidant for the semi-closed Brayton cycle power plant, is greater than 21%, by volume.

15. A system for enhancing the recovery of coalbed methane, including:
  a semi-closed Brayton cycle power plant, wherein an exhaust gas from the semi-closed Brayton cycle power plant provides a diluent gas mixture including substantial amounts of $N_2$ and $CO_2$;
an injection well configured to inject the diluent gas mixture from the semi-closed Brayton cycle power plant into a coalbed; and
a production well configured to harvest a production gas mixture from the coal bed, wherein the production gas mixture includes methane.

16. The system of paragraph 15, including a heat recovery steam generator configured to use an exhaust heat from the semi-closed Brayton cycle power plant to generate steam.

17. The systems of paragraphs 15 or 16, including a power plant configured to use the steam to generate electricity.

18. The systems of paragraphs 15, 16, or 17, including a gas separation system configured to generate a $CO_2$ rich gas stream and a $CO_2$ lean gas stream.

19. The systems of any of paragraphs 15-18, including injecting the $CO_2$ rich gas stream into the coalbed.

20. The systems of any of paragraphs 15-19, including a liquefied natural gas plant configured to use electricity generated by the semi-closed Brayton cycle power plant to power a liquefaction process.

21. A system for enhancing the recovery of coalbed methane, including:
a gas turbine configured to operate at a stoichiometrically balanced condition, wherein cooling is provided by a diluent gas injected into a combustor, and wherein the diluent gas substantially includes $N_2$ and $CO_2$;
a generator configured to convert mechanical energy provided by the gas turbine into electrical energy;
a heat recovery steam generator (HRSG) configured to generate steam by heating a boiler with an exhaust stream from the gas turbine;
a Rankine cycle power plant configured to generate electricity from the steam;
a cooler configured to condense water from the exhaust stream downstream of the HRSG, generating the diluent;
a diluent compressor configured to increase the pressure of the diluent and direct at least a portion of the diluent to the combustor;
an injection system configured to inject a portion of the diluent from the compressor into a coalbed; and
a production system configured to harvest a production gas from the coalbed, wherein the production gas includes methane.

22. The system of paragraph 21, including a desalination unit integrated into the HRSG that is configured to produce a fresh water stream.

23. The systems of paragraphs 21 or 22, including a compressor after a gas treating facility, wherein the compressor is configured to compress a stream of coal bed methane.

24. The systems of paragraphs 21, 22, or 23, including a pipeline configured to convey the compressed stream of coal bed methane to a market.

25. The systems of any of paragraphs 21-24, wherein at least a portion of the electricity from the power plant is used to power facilities associated with the production gas mixture.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A method for enhanced recovery of coalbed methane, comprising:
compressing a gaseous fuel for use in a semi-closed Brayton cycle power plant;
generating a gas mixture comprising $N_2$ and $CO_2$ in the semi-closed Brayton cycle power plant operating to combust the gaseous fuel and an oxygen component of an oxidant at a stoichiometric ratio;
injecting at least a portion of the gas mixture into a coal bed; and
recovering a mixed production gas comprising methane from the coal bed.

2. The method of claim 1, comprising completing an injection well in a coal bed.

3. The method of claim 1, comprising completing a production well in a coal bed.

4. The method of claim 1, comprising compressing the gas mixture prior to injection.

5. The method of claim 1, comprising using at least a portion of the mixed production gas to fuel the semi-closed Brayton cycle power plant.

6. The method of claim 1, comprising recovering heat energy from an exhaust generated by the semi-closed Brayton cycle power plant in a heat recovery steam generator (HRSG).

7. The method of claim 6, comprising generating power with steam generated in the HRSG.

8. The method of claim 1, comprising processing the mixed production gas to remove acid gases and water vapor to generate a natural gas capable of transport by pipeline.

9. The method of claim 8, comprising liquefying the natural gas.

10. The method of claim 1, comprising cooling the gas mixture prior to injection into the coal bed.

11. The method of claim 10, comprising recovering heat from the gas mixture to supply process heat to a facility.

12. The method of claim 1, wherein the oxidant for the semi-closed Brayton cycle power plant is air.

13. The method of claim 1, wherein the oxidant used in the semi-closed Brayton cycle power plant has an oxygen concentration greater than about 21% by volume.

14. A system for enhancing the recovery of coalbed methane, comprising:
a semi-closed Brayton cycle power plant operating to combust a gaseous fuel and an oxygen component of an oxidant at a stoichiometric ratio, wherein an exhaust gas from the semi-closed Brayton cycle power plant provides a diluent gas mixture comprising substantial amounts of $N_2$ and $CO_2$;
a compressor configured to compress the gaseous fuel prior to combustion in the semi-closed Brayton cycle power plant;
an injection well configured to inject the diluent gas mixture from the semi-closed Brayton cycle power plant into a coalbed; and
a production well configured to harvest a production gas mixture from the coal bed, wherein the production gas mixture comprises methane.

15. The system of claim 14, comprising a heat recovery steam generator configured to use an exhaust heat from the semi-closed Brayton cycle power plant to generate steam.

16. The system of claim 15, comprising a power plant configured to use the steam to generate electricity.

17. The system of claim 14, comprising a gas separation system configured to generate a $CO_2$ rich gas stream and a $CO_2$ lean gas stream.

18. The system of claim 17, comprising injecting the $CO_2$ rich gas stream into the coalbed.

19. The system of claim 14, comprising a liquefied natural gas plant configured to use electricity generated by the semi-closed Brayton cycle power plant to power a liquefaction process.

20. A system for enhancing the recovery of coalbed methane, comprising:
- a combustor associated with a gas turbine, the combustor configured to combust therein a gaseous fuel and an oxygen component of an oxidant at a stoichiometric ratio, wherein the gas turbine receives hot exhaust gases from the combustor, wherein cooling is provided by a diluent gas injected into the combustor, and wherein the diluent gas substantially comprises $N_2$ and $CO_2$;
- a generator configured to convert mechanical energy provided by the gas turbine into electrical energy;
- a heat recovery steam generator (HRSG) configured to generate steam by heating a boiler with an exhaust stream from the gas turbine;
- a Rankine cycle power plant configured to generate electricity from the steam;
- a cooler configured to condense water from the exhaust stream downstream of the HRSG, generating the diluent;
- a diluent compressor configured to increase the pressure of the diluent and direct at least a portion of the diluent to the combustor;
- an injection system configured to inject a portion of the diluent from the compressor into a coalbed;
- a production system configured to harvest a production gas from the coalbed, wherein the production gas comprises methane; and
- a compressor configured to compress a portion of the production gas to generate a compressed stream of coal bed methane, wherein a portion of the compressed stream of coal bed methane is used as part of the gaseous fuel.

21. The system of claim 20, comprising a desalination unit integrated into the HRSG that is configured to produce a fresh water stream.

22. The system of claim 20, comprising a pipeline configured to convey another portion of the compressed stream of coal bed methane to a market.

23. The system of claim 20, wherein at least a portion of the electricity from the power plant is used to power facilities associated with the production gas.

* * * * *